(12) United States Patent
Nguyen et al.

(10) Patent No.: US 7,461,696 B2
(45) Date of Patent: Dec. 9, 2008

(54) METHODS OF FRACTURING USING FLY ASH AGGREGATES

(75) Inventors: Philip D. Nguyen, Duncan, OK (US); Thomas D. Welton, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 300 days.

(21) Appl. No.: 11/001,146

(22) Filed: Nov. 30, 2004

(65) Prior Publication Data

US 2006/0113080 A1 Jun. 1, 2006

(51) Int. Cl.
E21B 43/267 (2006.01)
(52) U.S. Cl. .................................. 166/280.2
(58) Field of Classification Search ........................ None
See application file for complete search history.

(56) References Cited

U.S. PATENT DOCUMENTS

| | | | |
|---|---|---|---|
| 3,592,266 A | | 7/1971 | Tinsley |
| 3,659,651 A | | 5/1972 | Graham |
| 3,888,311 A | | 6/1975 | Cooke, Jr. |
| 3,933,205 A | | 1/1976 | Kiel |
| 4,785,884 A | * | 11/1988 | Armbruster .............. 166/280.2 |
| 5,373,901 A | | 12/1994 | Norman et al. |
| 5,403,822 A | | 4/1995 | Mueller et al. |
| 5,765,642 A | | 6/1998 | Surjaatmadja |
| 6,444,316 B1 | | 9/2002 | Reddy et al. |
| 6,488,091 B1 | | 12/2002 | Weaver et al. |
| 6,527,051 B1 | | 3/2003 | Reddy et al. |
| 6,544,071 B1 | | 4/2003 | Wu |
| 6,761,220 B2 | | 7/2004 | Blauch et al. |
| 7,004,255 B2 | * | 2/2006 | Boney ..................... 166/280.2 |
| 7,063,150 B2 | * | 6/2006 | Slabaugh et al. ............ 166/278 |
| 2002/0048676 A1 | * | 4/2002 | McDaniel et al. ........... 428/404 |
| 2005/0028979 A1 | * | 2/2005 | Brannon et al. .......... 166/280.2 |
| 2006/0048943 A1 | * | 3/2006 | Parker et al. ............. 166/308.1 |

FOREIGN PATENT DOCUMENTS

WO    WO 00/05302    2/2000

OTHER PUBLICATIONS

"Pillar Frac Stimulation Technique"; Halliburton Services; Fracturing Services Technical Data Sheet F-3150.
Foreign communcation related to a counterpart application dated Aug. 23, 2006.

* cited by examiner

*Primary Examiner*—Jennifer H Gay
*Assistant Examiner*—Kerry W Leonard
(74) *Attorney, Agent, or Firm*—Robert A. Kent; Baker Botts LLC (57) ABSTRACT

A method of propping at least one fracture in a subterranean formation is provided, the method comprising: forming a plurality of fly ash aggregates, each fly ash aggregate comprising an aqueous component and fly ash; introducing the plurality of fly ash aggregates into the at least one fracture; and curing at least a portion of the fly ash aggregates into at least one hardened mass. Also provided are methods of fracturing a subterranean formation and methods for the downhole formation of proppant particulates.

65 Claims, 4 Drawing Sheets

METHODS OF FRACTURING USING FLY ASH AGGREGATES

BACKGROUND

The present invention relates to hydraulic fracturing operations and, more particularly, to methods of fracturing a subterranean formation using fly ash aggregates.

Hydrocarbon-producing wells are often stimulated by hydraulic fracturing operations. In hydraulic fracturing operations, a viscous fracturing fluid, which also functions as a carrier fluid, is pumped into a producing zone at a rate and pressure such that the subterranean formation breaks down and at least one fracture is formed in the zone. Typically, particulate solids, such as sand, suspended in a portion of the fracturing fluid are then deposited in the fractures. These particulate solids, commonly referred to as "proppant particulates," serve to prevent the fractures from fully closing so that conductive channels are formed through which produced hydrocarbons can flow.

The proppant particulates used to prevent fractures from fully closing generally comprise particulate solids, such as sand, bauxite, ceramics, or nut hulls, which are deposited into fractures using traditional high proppant loading techniques. The proppant particulates and loading techniques suffer from an assortment of drawbacks that can limit the production potential of the well. The degree of success of a fracturing operation depends, at least in part, upon the resultant fracture porosity and conductivity once the fracturing operation is stopped and production is begun. Traditional fracturing operations place a large volume of proppant particulates into a fracture, and the porosity of the resultant packed, propped fracture is then at least partially related to the interconnected interstitial spaces between the abutting proppant particulates.

An alternative fracturing operation involves placing a much reduced volume of proppant in a fracture to create a high porosity fracture. As referred to herein, a "high porosity fracture" refers to a fracture that exhibits a porosity of greater than about 40%, after the fracture has closed or applied a substantial mechanical stress. In such operations, the proppant particulates within the fracture may be widely spaced but they are still sufficient to hold the fracture open and allow for production. Such operations allow for increased fracture conductivity due, at least in part, to the fact that the produced fluids may flow around widely spaced proppant particulates rather than just through the relatively small interstitial spaces in a packed proppant bed. While this fracturing concept has been investigated in the industry, the concept has not been successfully applied for a number of reasons. Among other things, loading techniques have not been developed that can appropriately place the proppant particulates so as to provide the desired fracture conductively.

SUMMARY

The present invention relates to hydraulic fracturing operations and, more particularly, to methods of fracturing a subterranean formation using fly ash aggregates.

In one embodiment, the present invention provides a method of fracturing a subterranean formation penetrated by a well bore, the method comprising: introducing a fracturing fluid into the well bore at or above a pressure sufficient to create or enhance at least one fracture in the subterranean formation; forming a plurality of fly ash aggregates, each fly ash aggregate comprising an aqueous component and fly ash; introducing the plurality of fly ash aggregates into the at least one fracture; and curing at least a portion of the fly ash aggregates into at least one hardened mass within the at least one fracture.

In another embodiment, the present invention provides a method of propping at least one fracture in a subterranean formation, the method comprising: forming a plurality of fly ash aggregates, each fly ash aggregate comprising an aqueous component and fly ash; introducing the plurality of fly ash aggregates into the at least one fracture; and curing at least a portion of the fly ash aggregates into at least one hardened mass within the at least one fracture.

In another embodiment, the present invention provides a method for the downhole formation of proppant particulates, the method comprising: forming a plurality of fly ash aggregates, each fly ash aggregate comprising an aqueous component and fly ash; introducing the plurality of fly ash aggregates into at least one fracture in a subterranean formation; contacting at least a portion of the fly ash aggregates with a phosphoric acid; and allowing the portion of the fly ash aggregates to cure into at least one hardened mass within the at least one fracture.

In yet another embodiment, the present invention provides a method of propping at least one fracture in a subterranean formation, the method comprising: forming a plurality of fly ash aggregates, each fly ash aggregate comprising an aqueous component and fly ash; suspending the plurality of fly ash aggregates in a carrier fluid; introducing the carrier fluid into the at least one fracture, the carrier fluid containing the plurality of fly ash aggregates suspended therein; contacting at least a portion of the fly ash aggregates with a phosphoric acid; allowing the portion of the fly ash aggregates to cure into at least one hardened mass within the at least one fracture; and recovering at least a portion of the carrier fluid from the at least one fracture.

The features and advantages of the present invention will be readily apparent to those skilled in the art upon a reading of the description of the specific embodiments that follows.

DRAWINGS

A more complete understanding of the present disclosure and advantages thereof may be acquired by referring to the following description taken in conjunction with the accompanying drawings, wherein.

While the present invention is susceptible to various modifications and alternative forms, specific exemplary embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION

The present invention relates to hydraulic fracturing operations and, more particularly, to methods of fracturing a subterranean formation using fly ash aggregates.

In one embodiment, the present invention provides a method of fracturing a subterranean formation, the subterranean formation penetrated by a well bore, the method comprising: introducing a fracturing fluid into the well bore at or above a pressure sufficient to create or enhance at least one fracture in the subterranean formation; forming a plurality of fly ash aggregates, each fly ash aggregate comprising an aqueous component and fly ash; introducing the plurality of fly ash aggregates into the at least one fracture; and curing at least a portion of the fly ash aggregates into at least one hardened mass within the at least one fracture. As used herein, the term "aggregate(s)" refers to a coherent body, such that when the aggregate is placed into the fracture(s) or into a carrier fluid, the aggregate should not become dispersed into smaller bodies without application of shear. As used herein, the term "hardened mass" refers to a solid mass formed from the curing of a single fly ash aggregate into the hardened mass; the curing of a single fly ash aggregate into multiple hardened masses, one of which is the hardened mass; or the curing of multiple fly ash aggregates, having agglomerated within the fracture, into the hardened mass.

Generally, the plurality of fly ash aggregates is introduced into the fracture(s) simultaneously with or proximate to the introduction of a carrier fluid into the fracture(s). Introduction of the carrier fluid and the fly ash aggregates into the fracture (s) should be continued until a desired fracturing treatment design is achieved. The fracturing treatment design should be similar to conventional hydraulic fracturing treatments, except for the proppant stage where its composition and placement are described herein. In some embodiments, the fracturing fluid and the carrier fluid may be the same fluid.

Due to their placement into the fracture(s) in conjunction with or proximate to the carrier fluid, the plurality of fly ash aggregates should be distributed throughout the fracture(s), wherein the spaces between each fly ash aggregate contain the carrier fluid. Next, the well bore should be shut in for a desired period of time, among other things, to allow at least a portion of the fly ash aggregates to cure into at least one hardened mass. The hardened masses should act as proppant particulates, thereby preventing the at least one fracture from fully closing. After the shut-in period, the carrier fluid should be recovered from the fracture(s), for example, by producing the carrier fluid out of the well bore during flow back cleanup or by recovering the carrier fluid during production of the well bore. Because at least a portion of the fly ash aggregates has cured into at least one hardened mass, at least a substantial portion of the hardened masses should not be recovered from the fracture(s) during flow back cleanup, before or during production of the well. However, it is recognized that, in some instances, a small portion of the plurality of fly ash aggregates (or hardened mass) may be recovered. Recovery of the carrier fluid from the fracture(s) should result in voids surrounding the hardened masses, wherein the voids provide flow paths through which produced hydrocarbons can flow.

Certain methods of the present invention comprise forming a plurality of fly ash aggregates. It is believed that the fly ash aggregates may be any of a variety of shapes, including ovals, spheroids, stringy masses with irregular shapes and sizes, combinations thereof, and the like. As those of ordinary skill in the art will appreciate, the fly ash aggregates may have a well-defined physical shape or may have an irregular geometry. In some embodiments, it may be desirable for each fly ash aggregate to be substantially the same size.

A variety of methodologies may be used to form the plurality of fly ash aggregates and introduce them into the fracture(s). In one example, to form the plurality of fly ash aggregates, a fly ash slurry should be provided. Because the fly ash slurry is used to form the fly ash aggregates, the fly ash aggregates will have substantially the same composition as the fly ash slurry; namely, both the fly ash slurry and the fly ash aggregates generally comprise an aqueous component and fly ash. A carrier fluid should also be provided. The fly ash slurry and carrier fluid will be discussed in more detail below. In one embodiment, a plurality of predetermined volumes of the fly ash slurry may be pumped intermittently into the well bore so that a plurality of fly ash aggregates may be introduced into the fracture(s). In some embodiments, each predetermined volume may be in the range of from about 0.01 gallon to about 5 gallons. However, one of ordinary skill in the art, with the benefit of this disclosure, will recognize that larger volumes of the fly ash slurry may be used, dependent upon, for example, the dimensions of the fracture(s). In one example, the fly ash slurry may be alternately pumped into the well bore with the carrier fluid. For example, a first portion of the carrier fluid may be introduced into the well bore. After introduction of the first portion, a predetermined volume of the fly ash slurry may be introduced into the well bore. Once the predetermined volume of the fly ash slurry has been introduced into the well bore, a second portion of the carrier fluid may be introduced into the well bore, thereby forming a fly ash aggregate in the well bore, the fly ash aggregate spaced between the first and second portions. These steps may be repeated until the desired amount of fly ash aggregates have been formed and introduced into the fracture(s). The predetermined volumes of the fly ash slurry that are being alternately pumped may remain constant or may be varied, such that the plurality of fly ash aggregates introduced into the fracture(s) are of varying sizes and shapes.

In another embodiment, the fly ash slurry is combined with the carrier fluid so that the fly ash slurry forms a plurality of fly ash aggregates in the carrier fluid. Among other things, in these embodiments, the plurality of fly ash aggregates should be suspended in the carrier fluid, carried by the carrier fluid into the fracture(s), and distributed within the fracture(s). Generally, in these embodiments, the fly ash slurry should be combined with the carrier fluid prior to introducing the carrier fluid into the well bore. In one embodiment, the plurality of fly ash aggregates are formed by shearing (e.g., cutting) the fly ash slurry as it is combined with the carrier fluid, for example, as the fly ash slurry is pumped and extruded from a container into a different container that contains the carrier fluid. In one certain embodiment, where the fly ash slurry is combined with the carrier fluid, a plurality of predetermined volumes of the fly ash slurry are intermittently injected into the carrier fluid, as the carrier fluid is being introduced into the well bore. The predetermined volumes of the fly ash slurry that are being intermittently injected into the carrier fluid may be remain constant or may be varied, such that the fly ash aggregates form in the carrier fluid in varying sizes and shapes. In some embodiments, each predetermined volume may be in the range of from about 0.01 gallon to about 5 gallons. However, one of ordinary skill in the art, with the benefit of this disclosure, will recognize that larger volumes of the fly ash slurry may be used, dependent upon, for example, the dimensions of the fracture(s).

In another embodiment, formation of the plurality of fly ash aggregates may comprise simultaneously introducing the carrier fluid and the fly ash slurry into the fracture(s). In these embodiments, the carrier fluid and the fly ash slurry may be introduced into the fracture(s) via separate flow paths, so as to form a plurality of fly ash aggregates. For example, one of the fluids (e.g., the carrier fluid or the fly ash slurry) may be delivered downhole and introduced into the fracture(s) via tubing that is disposed within the well bore while the other fluid (e.g., the carrier fluid or the fly ash slurry) may be delivered downhole and introduced into the fracture(s) via an annulus defined between the tubing and the casing (or a wall of the well bore for uncased portions of the well bore). As the fly ash slurry and the fracture slurry are cointroduced into the fracture(s), a plurality of fly ash aggregates should form and be distributed within the fracture(s). Among other things, this may minimize interaction between the carrier fluid and fly ash slurry and also may enhance the formation of layers between the two fluids. An example of a suitable fracturing technique that involves coinjection of fluids down the tubing and the annulus is described in U.S. Pat. No. 5,765,642, the relevant disclosure of which is incorporated herein by reference. One of ordinary skill, with the benefit of this disclosure, will recognize other suitable methods for forming the fly ash aggregates and introducing them into the fracture(s), dependent upon the particular application.

Figure 1A:
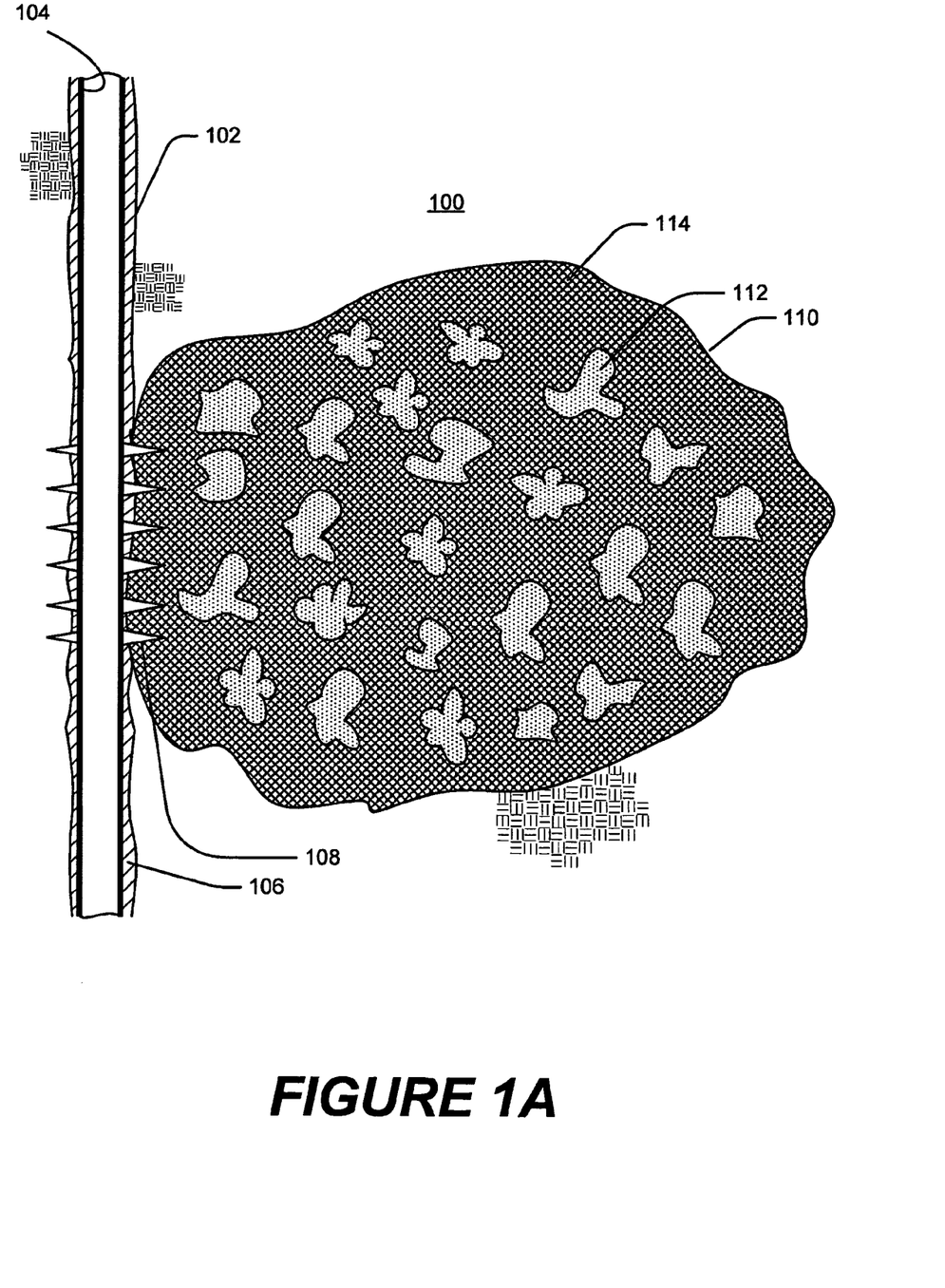
FIGS. 1A and 1B depict a schematic of a fracture that includes a plurality of fly ash aggregates before recovery of a carrier fluid in accordance with an embodiment of the present invention.

In accordance with the above-described steps, the plurality of fly ash aggregates should be introduced into the fracture(s) so that the fly ash aggregates are distributed through the length and height of the fracture(s) without packing or stacking together. It is preferred that the fly ash aggregates are randomly distributed throughout the length and height of the fracture(s). Despite the preference in forming partial monolayers of fly ash aggregates in the fracture(s), the potential for forming a full monolayer or a packed potion in the fracture always exists due to, among other things, uneven distribution of the fly ash aggregates, undesired accumulation of the fly ash aggregates, or particle settling at one location. FIG. 1A depicts a plurality of fly ash aggregates 112 distributed throughout fracture 110 in a partial monolayer arrangement.

Generally, the ratio of the plurality of fly ash aggregates to carrier fluid introduced into the fracture(s) will vary, dependent on the compositions of the fly ash aggregates and the carrier fluid, formation characteristics and conditions, the desired conductivity of the fracture, and other factors known to those of ordinary skill in the art. As will be understood by those of ordinary skill in the art, with the benefit of this disclosure, the higher the ratio of fly ash aggregates to carrier fluid introduced into the fracture(s), the fewer void channels or less conductive fractures will result. In some embodiments, the ratio of the plurality of fly ash aggregates to the carrier fluid introduced into the fracture(s) is in the range of from about 1:5 by volume to about 4:5 by volume.

The methods of the present invention further comprise curing at least a portion of the fly ash aggregates into at least one hardened mass. In some embodiments, a portion of the fly ash aggregates introduced into the at least one fracture are cured. In another embodiment, substantially all of the fly ash aggregates introduced into the at least one fracture are cured. In yet another embodiment, all of the fly ash aggregates introduced into the at least one fracture are cured. Generally, the fly ash aggregates should cure to form multiple hardened masses within the fracture(s). Each hardened mass within the fracture(s) may be formed from the curing of one or more fly ash aggregates. For example, a hardened mass may be formed from the curing of a single fly ash aggregate. Further, in one example, two or more hardened masses may be formed from a single fly ash aggregate that has become dispersed into smaller bodies within the at least one fracture. In another example, a hardened mass may be formed from multiple fly ash aggregates that have agglomerated within the fracture and cured into a single hardened mass. However, to provide maximum fracture conductivity, at least a substantial portion (and preferably substantially all) of the fly ash aggregates should not agglomerate within the fracture(s), but should instead be distributed throughout the fracture(s).

The fly ash aggregates may be cured by any suitable methodology, including contacting the fly ash aggregates with phosphoric acid and/or polyphosphoric acid. The fly ash aggregates may be contacted with the phosphoric acid and/or polyphosphoric acid, prior to, simultaneously with, and/or subsequent to the introduction of the fly ash aggregate into the at least one fracture. Upon contacting the fly ash aggregates with a sufficient concentration of phosphoric (and/or polyphosphoric) acid, at least portion of the fly ash aggregates should cure into at least one hardened mass. Among other things, the hardened masses should be capable of preventing the at least one fracture from fully closing. The rate of curing of the fly ash aggregates is dependent upon a number of factors, including the formation temperature, the concentration of phosphoric acid and/or polyphosphoric acid, and the existence of competing reactions (such as the acid spending on the formation). As will be discussed in more detail below, phosphoric acid and/or a phosphoric acid precursor (e.g., phosphorus pentoxide, polyphosphoric acid, and salts thereof) may be included in the carrier fluid and/or the fly ash slurry. Where included in the fly ash slurry, each fly ash aggregate should comprise the phosphoric acid, a phosphoric acid precursor, or a combination thereof.

According to the methods of the present invention, after placement of the plurality of fly ash aggregates into the fracture(s), the well bore may be shut in for a period of time. The necessary period of time for the shut-in period is dependent on, among other things, the composition of the fly ash aggregates and the carrier fluid used and the temperature of the formation. Generally, the shut-in period should be sufficient to allow the at least a portion of the fly ash aggregates to cure into hardened masses capable of preventing the fracture(s) from fully closing. Furthermore, in some embodiments, the shut-in period may be sufficient to allow the carrier fluid to break so that the carrier fluid may be recovered from the well, for example, during well cleanup flow back and/or during production of the well. Generally, the chosen period of time may be up to about 72 hours, or longer. Determining the proper period of time to shut in the formation is within the ability of one skilled in the art, with the benefit of this disclosure.

Among other things, after the shut-in period to allow for curing, the hardened masses should act as proppant particulates that prevent the fracture from fully closing, while providing for conductive channels through which hydrocarbons may be produced. Accordingly, the hardened masses should not flow back when the well is placed into production. Depending on the ratio of the plurality of fly ash aggregates to the carrier fluid introduced into the fracture(s), the compositions of the fly ash aggregates and the carrier fluid, the closure stress applied on the hardened masses, how much of the carrier fluid can be removed, and a variety of other factors, use of the hardened masses to hold the fracture open may provide for a higher porosity fracture than can be achieved utilizing conventional packed proppant beds. For example, it is believed that the methods of the present invention may be used to facilitate the formation of high porosity propped fractures having a porosity greater than about 40% while maintaining enough conductive channels for production. Some embodiments of the present invention may be used to form high porosity propped fractures exhibiting a porosity of at least about 50%. Other embodiments of the present invention may be used to form high porosity propped fractures exhibiting a porosity of at least about 60%. Other embodiments of the present invention may be used to form high porosity propped fractures exhibiting a porosity of at least about 70%. Other embodiments of the present invention may be used to form high porosity propped fractures exhibiting a porosity of at least about 80%. Other embodiments of the present invention may be used to form high porosity propped fractures exhibiting a porosity of at least about 90%. Porosity values expressed herein are stressed porosities, that is, the porosity after the fracture has closed or applied a substantial mechanical stress.

Figure 1B:
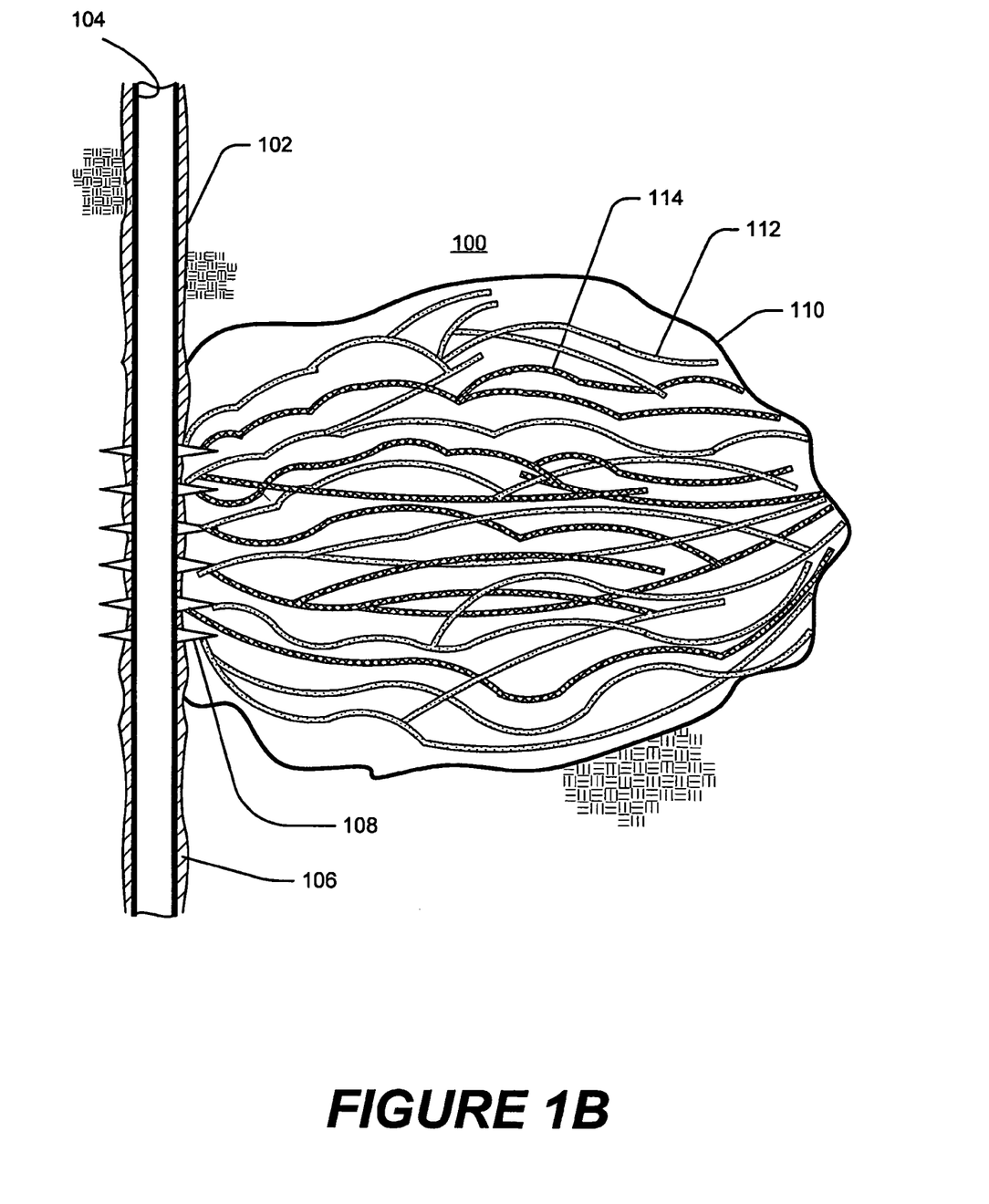

Referring now to FIGS. 1A and 1B, certain embodiments of the present invention are illustrated after introduction of a carrier fluid and a plurality of fly ash aggregates into fracture (s) in a subterranean formation. Subterranean formation 100 is shown penetrated by well bore 102. While FIGS. 1A and 1B depict well bore 102 as a generally vertical well, the methods of the present invention also may be performed in generally horizontal, inclined, or otherwise formed portions of wells. In addition, well bore 102 may be a primary well bore having one or more branch well bores extending therefrom, or well bore 102 may be a branch well bore extending laterally from a primary well bore. Generally, well bore 102 should be lined with casing 104 that is cemented to subterranean formation by cement sheath 106, among other things, to maintain well bore integrity. Those of ordinary skill in the art will appreciate the circumstances when well bore 102 should or should not be cased and whether such casing should or should not be cemented. Indeed, the present invention does not lie in whether or not to case a well bore or, if so, how. One or more perforations 108 are shown that extend through casing 104 and cement sheath 106 into subterranean formation 100. The one or more perforations 108 in casing 104 and cement sheath 106 may be created using any suitable technique. Furthermore, a fracture in subterranean formation 100 is depicted in FIGS. 1A and 1B as fracture 110 that extends in an essentially vertical plane that is approximately longitudinal or parallel to the axis of well bore 102. In addition, plurality of fly ash aggregates 112 are shown distributed in fracture 110. As discussed above, plurality of fly ash aggregates 112 may be formed in a variety of shapes, as depicted by FIGS. 1A and 1B. The spaces in fracture 110 between plurality of fly ash aggregates 112 contain carrier fluid 114.

Figure 2A:
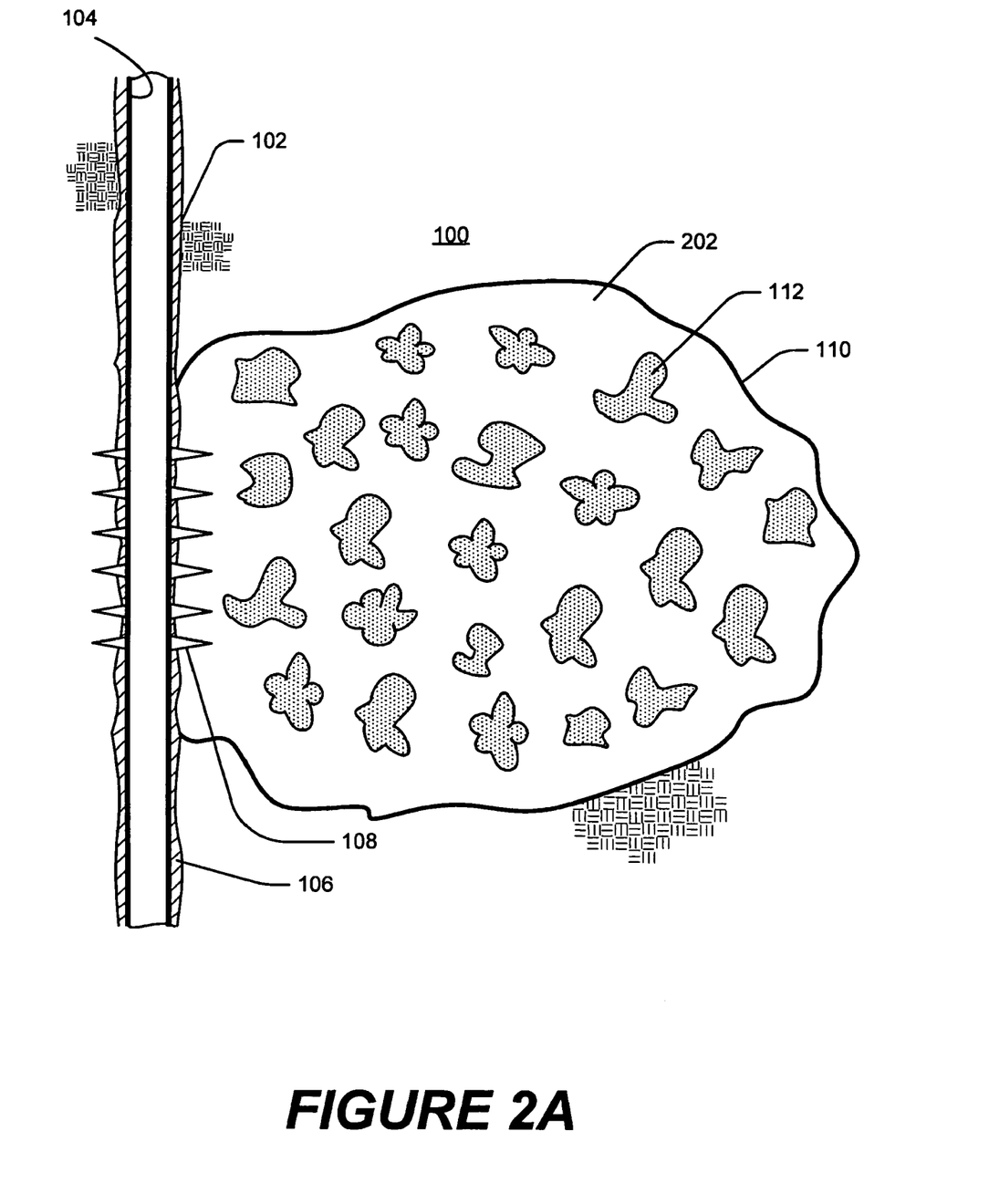
FIGS. 2A and 2B depict the schematic fracture of FIGS. 1A and 1B after recovery of the carrier fluid in accordance with one embodiment of the present invention.
Figure 2B:
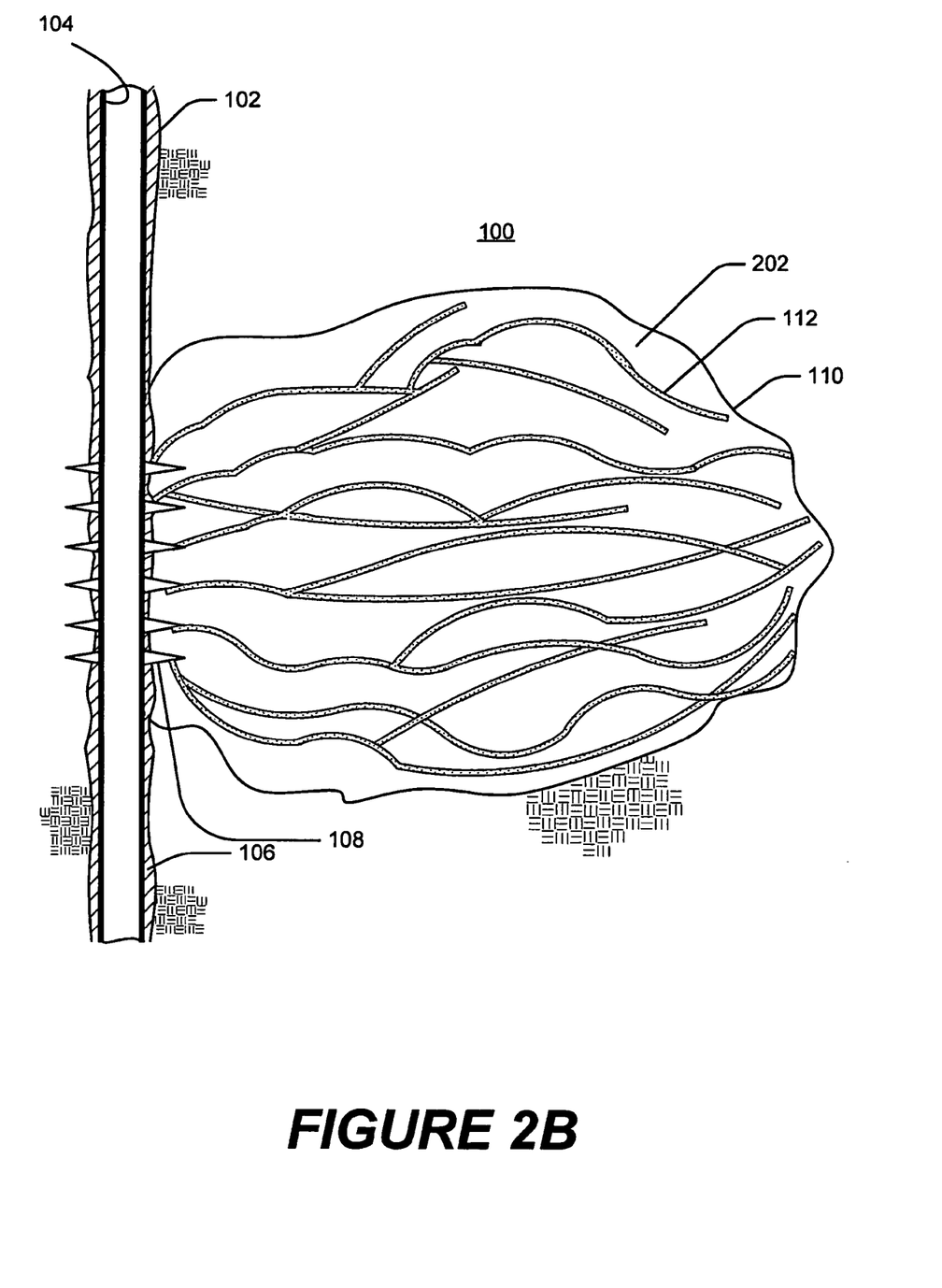

As discussed above, after the shut-in period, carrier fluid 114 may be recovered from fracture 110. Referring now to FIGS. 2A and 2B, fracture 110 is depicted after carrier fluid 114 (shown in FIGS. 1A and 1B) has been recovered. Plurality of fly ash aggregates 112 remains in fracture 110 after recovery of carrier fluid 114 therefrom. Due to the recovery of carrier fluid 114, voids 202 in the spaces between plurality of fly ash aggregates 112 of fly ash slurry provide flow paths for the production of hydrocarbons from subterranean formation 100.

As discussed above, formation of the plurality of fly ash aggregates generally comprises the provision of a fly ash slurry, the fly ash slurry comprising an aqueous component and fly ash. Additionally, other additives, such as phosphoric acid, phosphoric acid precursors, filler materials, and combinations thereof also may be included in the fly ash slurries as desired by one of ordinary skill in the art. Because the fly ash slurry is used to form the fly ash aggregates, the fly ash aggregates will have substantially the same composition as the fly ash slurry.

The aqueous component included in the fly ash slurries of the present invention may be fresh water, saltwater (e.g., water containing one or more salts dissolved therein), brine (e.g., saturated saltwater), seawater, or combinations thereof. Generally, the aqueous component may be from any source, provided that it does not adversely affect the fly ash slurries of the present invention. Further, the aqueous component may be present in an amount sufficient to form a pumpable slurry.

In certain embodiments, the aqueous component may be present in a fly ash slurry of the present invention in an amount in the range of from about 10% to about 80% by weight of the slurry therein. In certain embodiments, the aqueous component may be present in a fly ash slurry of the present invention in an amount in the range of from about 30% to about 60% by weight of the slurry therein. One of ordinary skill in the art, with the benefit of this disclosure, will recognize the appropriate amount of the aqueous component for a chosen application.

Any suitable fly ash may be used in the fly ash slurries of the present invention. Generally, fly ash is a pozzalon that is available in fine, spherical particles as a by-product from the combustion of coal in power plants. The fly ash may contain silica, alumina, iron, or a combination thereof. Examples of suitable fly ash include, but are not limited to, ASTM Class C fly ash, ASTM Class F fly ash, or combinations thereof. As those of ordinary skill art will recognize, the viscosity of the carrier fluid should be adjusted, based, on among other things, on the weight of the particular fly ash included in the fly ash slurry and, in turn, in the fly ash aggregates. Generally, the fly ash should be included in the fly ash slurries of the present invention in an amount sufficient to form the desired hardened masses upon contact with phosphoric acid. In certain embodiments, the fly ash may be included in a fly ash slurry of the present invention in an amount in the range of from about 20% to about 80% by weight of the fly ash slurry. In certain embodiments, the fly ash may be included in a fly ash slurry of the present invention in an amount in the range of from about 30% to about 60% by weight of the fly ash slurry.

The fly ash slurries of the present invention further may comprise one or more filler materials. While optional, the filler materials may be included in the fly ash slurries to provide, inter alia, resiliency, ductility, and/or toughness to the hardened masses of the fly ash slurry. Examples of suitable filler materials include, but are not limited to, cements (such as Portland cements), fibers, sand (such as beach sand, desert sand, or graded sand), bauxite, ceramic materials, glass materials (such as crushed, disposal glass material), polymer materials, Teflon® materials, nut shell pieces, seed shell pieces, cured resinous particulates comprising nut shell pieces, cured resinous particulates comprising seed shell pieces, fruit pit pieces, cured resinous particulates comprising fruit pit pieces, wood, composite particulates, lightweight particulates, microsphere plastic beads, ceramic microspheres, glass microspheres, man-made fibers, carbon black powder, combinations thereof, and the like. Suitable composite materials may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. Suitable fibers include those suitable for use in cement compositions, including, but not limited to, fibers formed from glass, steel, polyesters, polyamides, and polyolefines. Where present, the filler materials may be included in the fly ash slurries of the present invention in an amount sufficient to impart the desired properties to the hardened masses. In some embodiments, filler materials may be included in the fly ash slurries of the present invention in an amount in the range of from about 10% to about 80% by weight of the fly ash slurry. In some embodiments, filler materials may be included in the fly ash slurries of the present invention in an amount in the range of from about 20% to about 50% by weight of the fly ash slurry.

As previously discussed, at least a portion of the fly ash aggregates should be contacted by phosphoric acid and/or polyphosphoric acid, thereby curing the fly ash aggregates into the desired hardened masses. Accordingly, in some embodiments, the fly ash slurries of the present invention may comprise phosphoric acid, a phosphoric acid precursor, or a combination thereof. In these embodiments, each fly ash aggregate, in turn, comprises phosphoric acid, a phosphoric acid precursor, or a combination thereof.

In some embodiments, a fly ash slurry of the present invention may comprise phosphoric acid. Suitable phosphoric acids may include any one of three compounds that contain phosphorous, oxygen, and hydrogen, including orthophosphoric acid, pyrophosphoric acid, and metaphosphoric acid. Where present in the fly ash slurry, each fly ash aggregate contains phosphoric acid. The phosphoric acid in each fly ash aggregate should react with the fly ash present in the fly ash aggregate, so as to cure the fly ash aggregate into the desired hardened mass. In some embodiments, the rate of curing of the fly ash aggregates may be controlled so that the fly ash aggregates may be placed within the at least one fracture and do not substantially harden until after such placement. To control the rate of curing, the phosphoric acid may be encapsulated so as to delay the contact between the phosphoric acid and the fly ash, thereby delaying the resultant curing of the plurality of fly ash aggregates. Any suitable encapsulation method may be used to encapsulate the phosphoric acid. An example of a suitable encapsulation method is provided in U.S. Pat. No. 6,761,220, the relevant disclosure of which is incorporated herein by reference. Further, the viscosity of the fly ash slurry may be increased so as to control the diffusion of the acid through the fly ash aggregates, which, in turn, delays contact between the phosphoric acid and the fly ash.

Generally, the concentration of the phosphoric acid in the fly ash slurry should be sufficient so that the fly ash aggregates cure into the desired hardened masses. In some embodiments, the phosphoric acid may present in the fly ash slurries of the present invention in an amount in the range of from about 5% to about 40% by weight of the fly ash slurry. As those of ordinary skill in the art will appreciate, the amount of phosphoric acid to be included in the fly ash slurry may need to be increased where the phosphoric acid reacts with the subterranean formation, e.g., in carbonate formations.

In some embodiments, a fly ash slurry of the present invention may comprise a phosphoric acid precursor that hydrolyzes to form phosphoric acid. Examples of suitable phosphoric acid precursors include, but are not limited to, phosphorus pentoxide, polyphosphoric acid, salts of phosphoric acid, salts of polyphosphoric acid, and combinations thereof. Suitable polyphosphoric acids include dipolyphosphoric acid, tripolyphosphoric acid, tetrapolyphosphoric acid, combinations thereof, and the like. Suitable salts of phosphoric acid include, but are not limited to, orthophosphates, pyrophosphates, metaphosphates, and the like. Suitable salts of polyphosphoric acid include polyphosphates and the like.

Where present in the fly ash slurry, each fly ash aggregate contains the phosphoric acid precursor. Due to contact with the aqueous component of the fly ash aggregate, hydrolysis of the phosphoric acid precursors should occur with time and temperature. Upon its hydrolysis, the phosphoric acid precursor forms phosphoric acid in each fly ash aggregate, wherein the phosphoric acid contacts the fly ash present in each fly ash aggregate so as to cure each fly ash aggregate into the desired hardened masses. In the case of certain phosphoric acid precursors, their hydrolysis may form an intermediary, which, in turn, hydrolyzes to form phosphoric acid. For example, phosphorus pentoxide hydrolyzes to form a polyphosphoric acid, which, in turn, hydrolyzes to form phosphoric acid. As the phosphoric acid precursor hydrolyzes to form phosphoric acid that reacts with the fly ash, voids or holes may be left behind in the hardened masses, thereby resulting in enhanced conductivity for the at least one fracture. Moreover, where polyphosphoric acid is used (or formed by hydrolysis of phosphorous pentoxide), the polyphosphoric acid, as well as the phosphoric acid, reacts with the fly ash aggregates to form the desired hardened masses, in addition hydrolyzing to form phosphoric acid.

Generally, at least a substantial portion of the phosphoric acid precursor in a particular fly ash aggregate should not hydrolyze until after introduction of that particular fly ash aggregate into the at least one fracture so that contact between the phosphoric acid and fly ash occurs at a desired time, e.g., after introduction into the at least one fracture. The rate of hydrolysis of the phosphoric acid precursors will vary based on a number factors, including the specific phosphoric acid precursor, bottomhole temperature, the amount of the aqueous component available, and the concentration of phosphoric acid precursor in each fly ash aggregate. Due to the viscosity of the polyphosphoric acid formed by hydrolysis of the phosphorous pentoxide, the polyphosphoric acid may form a thin film (or "skin") on the phosphorous pentoxide. This film of polyphosphoric acid should slow the rate of hydrolysis of the phosphorous pentoxide. In some embodiments, the phosphoric acid precursors may be encapsulated so as to delay the hydrolysis thereof, thereby delaying the formation of the phosphoric acid. Any suitable encapsulation method may be used to encapsulate the phosphoric acid precursors. Examples of suitable encapsulation methods are provided in U.S. Pat. Nos. 5,373,901; 6,444,316; 6,527,051; 6,554,071; and 6,761,220, the relevant disclosures of which are incorporated herein by reference. Further, the viscosity of the fly ash slurry may be increased so as to control the diffusion of the acid through each fly ash aggregate, which, in turn, delays contact between the phosphoric acid and the fly ash.

Generally, the phosphoric acid precursor should be present in the fly ash slurry in an amount sufficient to provide, upon hydrolysis of the phosphoric acid precursor, a sufficient concentration of phosphoric acid so that the masses of the fly ash slurry cure to form the desired hardened masses. In some embodiments, the phosphoric acid precursor may present in the fly ash slurries of the present invention in an amount in the range of from about 5% to about 40% by weight of the fly ash slurry. As those of ordinary skill in the art will appreciate, the amount of the phosphoric acid precursor to be included in the fly ash slurry may need to be increased where the phosphoric acid that is formed reacts with the subterranean formation, e.g., in carbonate formations.

In some embodiments, the fly ash slurries of the present invention may be foamed. Where foamed, the fly ash slurries should further contain a gas, such as nitrogen or carbon dioxide. Generally, the gas may present in a fly ash slurry of the present invention in an amount sufficient to foam the fly ash slurry. In some embodiments, the gas may be present in the fly ash slurries of the present invention in an amount in the range of from about 10% to about 70% by volume of the fly ash slurry.

As discussed above, the fly ash aggregates generally are placed into the fracture(s) in conjunction with or proximate to a carrier fluid. In some embodiments, the carrier fluid is the same as the fracturing fluid. In some embodiments, the plurality of fly ash aggregates may be suspended in the carrier fluid. Generally the carrier fluid should have a viscosity sufficient to transport the fly ash aggregates. As those of ordinary skill art will recognize, the viscosity of the carrier fluid should be adjusted, based on, among other things, the weight of the particular fly ash included in the fly ash slurry and, in turn, in the fly ash aggregates.

Any suitable carrier fluid that may be used in subterranean operations may be used in accordance with the teachings of the present invention, including ungelled aqueous fluids, aqueous gels, viscoelastic surfactant gels, oil gels, foamed gels, and emulsions. Where the carrier fluid is an ungelled aqueous fluid, the carrier fluid should be introduced into the well bore at a sufficient rate to transport proppant (where desired) and/or masses of a fly ash slurry of the present invention (as necessary). Suitable emulsions can be comprised of two immiscible liquids, such as an aqueous liquid or gelled liquid, and a hydrocarbon. Suitable foams may be created by the addition of a gas, such as carbon dioxide or nitrogen. Suitable aqueous gels are generally comprised of an aqueous component and one or more gelling agents. In exemplary embodiments of the present invention, the carrier fluids are aqueous gels comprised of an aqueous component, a gelling agent for gelling the water and increasing its viscosity, and, optionally, a crosslinking agent for crosslinking the gel and further increasing the viscosity of the fluid. The increased viscosity of the gelled, or gelled and cross-linked, aqueous gels, inter alia, reduces fluid loss and allows the carrier fluid to transport proppant particulates (where desired) and/or fly ash aggregates (where necessary). The aqueous component used to form the aqueous gel may be fresh water, saltwater, saltwater, brine, or any other aqueous liquid that does not adversely react with the other components. The density of the aqueous component can be increased to provide additional particle transport and suspension in the present invention.

A variety of gelling agents may be used, including hydratable polymers that contain one or more functional groups such as hydroxyl, carboxyl, sulfate, sulfonate, amino, or amide groups. Suitable gelling agents typically comprise biopolymers, synthetic polymers, or a combination thereof. A variety of gelling agents can be used in conjunction with the methods and compositions of the present invention, including, but not limited to, hydratable polymers that contain one or more functional groups such as hydroxyl, cis-hydroxyl, carboxylic acids, derivatives of carboxylic acids, sulfate, sulfonate, phosphate, phosphonate, amino, or amide. In certain exemplary embodiments, the gelling agents may be biopolymers comprising polysaccharides, and derivatives thereof that contain one or more of these monosaccharide units: galactose, mannose, glucoside, glucose, xylose, arabinose, fructose, glucuronic acid, or pyranosyl sulfate. Examples of suitable polymers include, but are not limited to, xanthan, guar gum and derivatives thereof (such as hydroxypropyl guar and carboxymethylhydroxypropyl guar), and cellulose derivatives (such as hydroxyethyl cellulose). Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, and polyvinylpyrrolidone. In other exemplary embodiments, the gelling agent molecule may be depolymerized. The term "depolymerized," as used herein, generally refers to a decrease in the molecular weight of the gelling agent molecule. Depolymerized gelling agent molecules are described in U.S. Pat. No. 6,488,091, the relevant disclosure of which is incorporated herein by reference. Suitable gelling agents generally may be present in the aqueous gels in an amount in the range of from about 0.01% to about 10% by weight of the water therein. In certain exemplary embodiments, the gelling agents are present in the aqueous gel in an amount in the range of from about 0.01% to about 2% by weight of the water therein.

Crosslinking agents may be used to crosslink gelling agent molecules to form crosslinked gelling agents. Crosslinking agents typically comprise at least one metal ion that is capable of crosslinking polymer molecules. Examples of suitable crosslinking agents include, but are not limited to, zirconium compounds (such as, for example, zirconium lactate, zirconium lactate triethanolamine, zirconium acetylacetonate, zirconium citrate, and zirconium diisopropylamine lactate); titanium compounds (such as, for example, titanium lactate, titanium malate, titanium citrate, titanium ammonium lactate, titanium triethanolamine, and titanium acetylacetonate); aluminum compounds (such as, for example, aluminum lactate or aluminum citrate); antimony compounds; chromium compounds; iron compounds; copper compounds; zinc compounds; or a combination thereof. An example of a suitable commercially available zirconium-based crosslinking agent is the "CL-24™" crosslinker available from Halliburton Energy Services, Inc., Duncan, Okla. An example of a suitable commercially available titanium-based crosslinking agent is the "CL-39™" crosslinker available from Halliburton Energy Services, Inc., Duncan, Okla. Suitable crosslinking agents generally are present in the aqueous gels in an amount sufficient to provide, inter alia, the desired degree of crosslinking between gelling agent molecules. In certain exemplary embodiments of the present invention, the crosslinking agents may be present in the aqueous gels in an amount in the range from about 0.001% to about 10% by weight of the water in the carrier fluid. In certain exemplary embodiments of the present invention, the crosslinking agents may be present in the aqueous gels in an amount in the range from about 0.01% to about 1% by weight of the water therein. Individuals skilled in the art, with the benefit of this disclosure, will recognize the exact type and amount of crosslinker to use depending on factors such as the specific gelling agent, desired viscosity, and formation conditions.

The gelled, or gelled and cross-linked, aqueous gels may also comprise a gel breaker. Any suitable gel breaker may be employed, including encapsulated gel breaker and internal delayed gel breakers such as enzyme, oxidizing, acid buffer, or temperature-activated gel breakers. The gel breakers cause the viscous aqueous gels to revert to thin fluids that can be produced back to the surface at a desired time. The gel breaker used is typically present in the aqueous gels in an amount in the range of from about 0.5% to about 10% by weight of the gelling agent. The aqueous gels may also include one or more of a variety of well-known additives, such as gel stabilizers, fluid loss control additives, clay stabilizers, bactericides, and the like.

Optionally, proppant particulates may be included in the carrier fluids. Proppant particulates used in accordance with the present invention are generally of a size such that formation particulates that may migrate with produced fluids are prevented from being produced from the subterranean zone. Any suitable proppant particulates may be used, including sand (such as beach sand, desert sand, or graded sand), bauxite; ceramic materials; glass materials; polymer materials; Teflon® materials; nut shell pieces; seed shell pieces; cured resinous particulates comprising nut shell pieces; cured resinous particulates comprising seed shell pieces; fruit pit pieces; cured resinous particulates comprising fruit pit pieces; wood; composite particulates and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. Generally, the proppant has a size in the range of from about 4 to about 400 mesh, U.S. Sieve Series. In some embodiments of the present invention, the proppant is graded sand having a particle size in the range of from about 10 to about 70 mesh, U.S. Sieve Series.

As previously discussed, at least a portion of the fly ash aggregates should be contacted by phosphoric acid and/or polyphosphoric acid, thereby curing the fly ash aggregates into the desired hardened masses. Accordingly, in some embodiments, a carrier fluid of the present invention may comprise phosphoric acid, a phosphoric acid precursor, or a combination thereof. In one certain embodiment, each fly ash aggregate comprises phosphoric acid, a phosphoric acid precursor, or a combination thereof, and the carrier fluid comprises phosphoric acid, a phosphoric acid precursor, or a combination thereof.

In some embodiments, a carrier fluid of the present invention may comprise phosphoric acid. Suitable phosphoric acids may include any one of three compounds that contain phosphorous, oxygen, and hydrogen, including orthophosphoric acid, pyrophosphoric acid, and metaphosphoric acid. Where present in the carrier fluid, the phosphoric acid should contact each fly ash aggregate so as to cure the fly ash aggregate into the desired hardened mass. In some embodiments, the rate of curing of the plurality of fly ash aggregates may be controlled so that the plurality of fly ash aggregates may be placed within the at least one fracture and do not substantially harden until after such placement. To control the rate of curing, the phosphoric acid may be encapsulated so as to delay the contact between the phosphoric acid and the fly ash aggregates, thereby delaying the resultant curing of the fly ash aggregates, thereby delaying the formation of the phosphoric acid. Any suitable encapsulation method may be used to encapsulate the phosphoric acid. An example of a suitable encapsulation method is provided in U.S. Pat. No. 6,761,220. Further, the viscosity of the carrier fluid may be increased so as to control the diffusion of the acid therethrough, which, in turn, delays contact between the phosphoric acid and the plurality of fly ash aggregates.

Generally, the concentration of the phosphoric acid in the carrier fluid should be sufficient to cure the fly ash aggregates into the desired hardened masses. In some embodiments, the phosphoric acid may be present in a carrier fluid of the present invention in an amount in the range of from about 5% to about 40% by weight of the carrier fluid. As those of ordinary skill in the art will appreciate, the amount of phosphoric acid to be included in the carrier fluid may need to be increased where the phosphoric acid reacts with the subterranean formation, e.g., in carbonate formations.

In some embodiments, a carrier fluid of the present invention may comprise a phosphoric acid precursor that hydrolyzes to form phosphoric acid. Examples of suitable phosphoric acid precursors include, but are not limited to, phosphorous pentoxide, polyphosphoric acid, salts of phosphoric acid, salts of polyphosphoric acid, and combinations thereof. Suitable polyphosphoric acids include dipolyphosphoric acid, tripolyphosphoric acid, tetrapolyphosphoric acid, combinations thereof, and the like. Suitable salts of phosphoric acid include, but are not limited to, orthophosphates, pyrophosphates, metaphosphates, and combinations thereof. Suitable salts of polyphosphoric acid include polyphosphates and the like.

Accordingly, due to contact with the aqueous component of the carrier fluid and/or the fly ash aggregates, hydrolysis of the phosphoric acid precursors should occur with time and temperature. Upon its hydrolysis, the phosphoric acid precursor forms phosphoric acid, wherein the phosphoric acid contacts the fly ash aggregates present in the at least one fracture in the subterranean formation so as to cure the plurality of fly ash aggregates into the desired hardened masses. For the case of certain phosphoric acid precursors, their hydrolysis may form an intermediary, which, in turn, hydrolyzes to form phosphoric acid. For example, phosphorous pentoxide hydrolyzes to form polyphosphoric acid, which, in turn, hydrolyzes to form phosphoric acid. Moreover, where polyphosphoric acid is used (or formed by hydrolysis of phosphorous pentoxide), the polyphosphoric acid, as well as the phosphoric acid, reacts with the fly ash aggregates to form the desired hardened masses, in addition hydrolyzing to form phosphoric acid.

Generally, at least a substantial portion of the phosphoric acid precursor should not hydrolyze until after introduction of the carrier fluid into the at least one fracture so that contact between the phosphoric acid and fly ash aggregates occurs at a desired time, e.g., after introduction into the at least one fracture. The rate of hydrolysis of the phosphoric acid precursors will vary based on a number of factors, including the specific phosphoric acid precursor, bottomhole temperature, and the concentration of phosphoric acid precursor in the carrier fluid. Due to the viscosity of the polyphosphoric acid formed by hydrolysis of the phosphorous pentoxide, the polyphosphoric acid may form a thin film (or "skin") on the phosphorous pentoxide. This film of polyphosphoric acid should slow the rate of hydrolysis of the phosphorous pentoxide. In some embodiments, the phosphoric acid precursors may be encapsulated so as to delay the hydrolysis thereof, thereby delaying the formation of the phosphoric acid. Any suitable encapsulation method may be used to encapsulate the phosphoric acid precursors. Examples of suitable encapsulation methods are provided in U.S. Pat. Nos. 5,373,901; 6,444, 316; 6,527,051; 6,554,071; and 6,761,220. Further, the viscosity of the carrier fluid may be increased so as to control the diffusion of the acid therethrough, which, in turn, delays contact between the phosphoric acid and the masses of the fly ash slurry.

Where present, the phosphoric acid precursor should be present in the carrier fluid in an amount sufficient to provide, upon hydrolysis of the phosphoric acid precursor, a sufficient concentration of phosphoric acid so that the plurality of the fly ash aggregates cure to form the desired hardened masses. In some embodiments, the phosphoric acid precursor may be present in the carrier fluids of the present invention in an amount in the range of from about 5% to about 40% by weight of the carrier fluid. As those of ordinary skill in the art will appreciate, the amount of the phosphoric acid precursor to be included in the carrier fluid may need to be increased where the phosphoric acid that is formed reacts with the subterranean formation, e.g., in carbonate formations.

In one embodiment, the present invention provides a method of fracturing a subterranean formation penetrated by a well bore, the method comprising: introducing a fracturing fluid into the well bore at or above a pressure sufficient to create or enhance at least one fracture in the subterranean formation; forming a plurality of fly ash aggregates, each fly ash aggregate comprising an aqueous component and fly ash; introducing the plurality of fly ash aggregates into the at least one fracture; and curing at least a portion of the fly ash aggregates into at least one hardened mass within the at least one fracture.

In another embodiment, the present invention provides a method of propping at least one fracture in a subterranean formation, the method comprising: forming a plurality of fly ash aggregates, each fly ash aggregate comprising an aqueous component and fly ash; introducing the plurality of fly ash aggregates into the at least one fracture; and curing at least a portion of the fly ash aggregates into at least one hardened mass within the at least one fracture.

In another embodiment, the present invention provides a method for the downhole formation of proppant particulates, the method comprising: forming a plurality of fly ash aggregates, each fly ash aggregate comprising an aqueous component and fly ash; introducing the plurality of fly ash aggregates into at least one fracture in a subterranean formation; contacting at least a portion of the fly ash aggregates with a phosphoric acid; and allowing the portion of the fly ash aggregates to cure into at least one hardened mass within the at least one fracture.

In yet another embodiment, the present invention provides a method of propping at least one fracture in a subterranean formation, the method comprising: forming a plurality of fly ash aggregates, each fly ash aggregate comprising an aqueous component and fly ash; suspending the plurality of fly ash aggregates in a carrier fluid; introducing the carrier fluid into the at least one fracture, the carrier fluid containing the plurality of fly ash aggregates suspended therein; contacting at least a portion of the fly ash aggregates with a phosphoric acid; allowing the portion of the fly ash aggregates to cure into at least one hardened mass within the at least one fracture; and recovering at least a portion of the carrier fluid from the at least one fracture.

Therefore, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of fracturing a subterranean formation penetrated by a well bore, comprising:
   introducing a fracturing fluid into the well bore at or above a pressure sufficient to create or enhance at least one fracture in the subterranean formation;
   forming a plurality of fly ash aggregates, each fly ash aggregate comprising an aqueous component and fly ash;
   wherein the plurality of fly ash aggregates are introduced into the at least one fracture so that each fracture is a high porosity propped fracture having a porosity of at least about 40%;
   and
   curing at least a portion of the fly ash aggregates into at least one hardened mass within the at least one fracture.

2. The method of claim 1 wherein the high porosity propped fracture has a porosity of at least about 60%.

3. The method of claim 1 wherein the high porosity propped fracture has a porosity of at least about 90%.

4. The method of claim 1 wherein the fly ash aggregates are in the shape of ovals, spheroids, stringy masses, or a combination thereof.

5. The method of claim 1 wherein each of the plurality of fly ash aggregates is substantially the same size.

6. The method of claim 1 wherein forming the plurality of fly ash aggregates comprises providing slurry, the slurry comprising the aqueous component and the fly ash.

7. The method of claim 6 wherein forming the plurality of fly ash aggregates comprises pumping intermittently the slurry into the well bore.

8. The method of claim 6 wherein forming the plurality of fly ash aggregates comprises:
   providing a carrier fluid in a container;
   pumping the fly ash slurry comprising the aqueous component and the fly ash into the container; and
   shearing the fly ash slurry as it is pumped into the container that contains the carrier fluid, so as to form the plurality of fly ash aggregates.

9. The method of claim 6 wherein forming the plurality of fly ash aggregates comprises:
   providing a carrier fluid;
   introducing the carrier fluid into the well bore; and
   injecting a plurality of predetermined volumes of the slurry into the carrier fluid as the carrier fluid is introduced into the well bore, so as to form the plurality of fly ash aggregates.

10. The method of claim 9 wherein each predetermined volume is in the range of from about 0.01 gallon to about 5 gallons.

11. The method of claim 9 wherein the plurality of the predetermined volumes of the slurry are injected into the carrier fluid prior to the introduction of the carrier fluid into the well bore.

12. The method of claim 6 wherein forming the plurality of fly ash aggregates comprises:
   providing a carrier fluid;
   introducing the carrier fluid into the at least one fracture; and
   introducing the slurry into the at least one fracture, wherein the carrier fluid and the fly ash slurry are simultaneously introduced into the at least one fracture via separate flow paths.

13. The method of claim 6 wherein the aqueous component is selected from the group consisting of: fresh water, saltwater, seawater, brine.

14. The method of claim 6 wherein the aqueous component is present in the fly ash slurry in an amount in the range of from about 10% to about 80% by weight of the fly ash slurry.

15. The method of claim 6 wherein the fly ash comprises a component selected from the group consisting of: silica, alumina, iron.

16. The method of claim 6 wherein the fly ash is ASTM Class C fly ash, ASTM Class F fly ash, or a combination thereof.

17. The method of claim 6 wherein the fly ash is present in the fly ash slurry in an amount in the range of from about 20% to about 80% by weight of the fly ash slurry.

18. The method of claim 6 wherein the fly ash slurry comprises a filler material.

19. The method of claim 18 wherein the filler material is selected from the group consisting of: a cement, a fiber, a sand, a bauxite, a ceramic material, a glass material, a polymer material, a nut shell piece, a seed shell piece, a cured resinous particulate comprising nut shell pieces, a cured resinous particulate comprising seed shell pieces, a fruit pit piece, a cured resinous particulate comprising fruit pit pieces, wood, a composite particulate, a lightweight particulate, a microsphere plastic bead, a ceramic microsphere, a glass microsphere, a man-made fiber, carbon black powder, and a combination thereof.

20. The method of claim 6 wherein the fly ash slurry comprises a component selected from the group consisting of: a phosphoric acid, a phosphoric acid precursor, and a combination thereof.

21. The method of claim 6 wherein the fly ash slurry comprises a component selected from the group consisting of: a phosphorous pentoxide, a polyphosphoric acid, a salt of polyphosphoric acid, a salt of phosphoric acid, and a combination thereof.

22. The method of claim 6 wherein the fly ash slurry comprises a component selected from the group consisting of: a dipolyphosphoric acid, a tripolyphosphoric acid, a tetrapolyphosphoric acid, an orthophosphates, a pyrophosphate, a metaphosphate, a polyphosphate, and a combination thereof.

23. The method of claim 6 wherein the fly ash slurry comprises encapsulated phosphoric acid.

24. The method of claim 6 wherein a phosphoric acid is present in the fly ash slurry in an amount in the range of from about 5% to about 40% by weight of the fly ash slurry.

25. The method of claim 6 wherein the fly ash slurry comprises an encapsulated phosphoric acid precursor.

26. The method of claim 6 wherein a phosphoric acid precursor is present in the fly ash slurry in an amount in the range of from about 5% to about 40% by weight of the fly ash slurry.

27. The method of claim 6 wherein the fly ash slurry is foamed.

28. The method of claim 1 further comprising
providing a carrier fluid; and
suspending the plurality of fly ash aggregates in the carrier fluid.

29. The method of claim 28 wherein introducing the plurality of fly ash aggregates into the at least one fracture comprises introducing the carrier fluid into the at least one fracture.

30. The method of claim 29 wherein the ratio of the plurality of fly ash aggregates to the carrier fluid introduced into the at least one fracture is in the range of from about 1:5 by volume to about 4:5 by volume.

31. The method of claim 29 further comprising recovering at least a portion of the carrier fluid from the at least one fracture, wherein at least a substantial portion of the hardened masses is not recovered from the at least one fracture.

32. The method of claim 28 wherein the fracturing fluid and the carrier fluid are the same fluid.

33. The method of claim 28 wherein the carrier fluid comprises a component selected from the group consisting of: an aqueous gel, an oil gel, a foamed gel, an emulsion, a viscoelastic surfactant gel, and a combination thereof.

34. The method of claim 28 wherein the carrier fluid comprises proppant particulates.

35. The method of claim 28 wherein the carrier fluid comprises a gel breaker.

36. The method of claim 28 wherein the carrier fluid comprises a component selected from the group consisting of: a phosphoric acid, a phosphoric acid precursor, and a combination thereof 37. The method of claim 28 wherein the carrier fluid comprises encapsulated phosphoric acid.

38. The method of claim 28 wherein a phosphoric acid is present in the carrier fluid in an amount in the range of from about 5% to about 40% by weight of the carrier fluid.

39. The method of claim 28 wherein the carrier fluid comprises a component selected from the group consisting of: a phosphorous pentoxide, a polyphosphoric acid, a salt of polyphosphoric acid, a salt of phosphoric acid, and a combination thereof.

40. The method of claim 28 wherein the carrier fluid comprises an encapsulated phosphoric acid precursor.

41. The method of claim 28 wherein a phosphoric acid precursor is present in carrier fluid in an amount in the range of from about 5% to about 40% by weight of the carrier fluid.

42. The method of claim 1 wherein the curing comprises contacting the portion of the fly ash aggregates with a phosphoric acid.

43. The method of claim 42 wherein the phosphoric acid comprises: an orthophosphoric acid, a metaphosphoric acid, a pyrophosphoric acid, and a combination thereof.

44. The method of claim 42 further comprising allowing a phosphoric acid precursor to hydrolyze so as to form the phosphoric acid.

45. The method of claim 1 wherein the curing comprises contacting the portion of the fly ash aggregates with a polyphosphoric acid.

46. The method of claim 1 wherein the portion is all or substantially all of the fly ash aggregates introduced into the at least one fracture.

47. The method of claim 1 further comprising shutting in the well bore for a period of time after the introducing the plurality of fly ash aggregates into the at least one fracture.

48. A method of propping at least one fracture in a subterranean formation, comprising:
forming a plurality of fly ash aggregates, each fly ash aggregate comprising an aqueous component and fly ash;
introducing the plurality of fly ash aggregates into the at least one fracture;
wherein at least one fracture is a high porosity propped fracture having a porosity of at least about 40%; and
curing at least a portion of the fly ash aggregates into at least one hardened mass within the at least one fracture.

49. The method of claim 48 wherein the fly ash aggregates are in the shape of ovals, spheroids, stringy masses, or a combination thereof.

50. The method of claim 48 wherein each fly ash aggregate comprises a component selected from the group consisting of: a phosphoric acid, a phosphoric acid precursor, and a combination thereof.

51. The method of claim 48 wherein forming the plurality of fly ash aggregates comprises:
providing a carrier fluid;
introducing the carrier fluid into a well bore penetrating the subterranean formation;
providing a fly ash slurry, the fly ash slurry comprising the aqueous component and the fly ash; and
injecting a plurality of predetermined volumes of the fly ash slurry into the carrier fluid as the carrier fluid is introduced into the well bore, so as to form the plurality of fly ash aggregates.

52. The method of claim 48 further comprising:
providing a carrier fluid; and
suspending the plurality of fly ash aggregates in the carrier fluid.

53. The method of claim 52 wherein introducing the plurality of fly ash aggregates into the at least one fracture comprises introducing the carrier fluid into the at least one fracture.

54. The method of claim 53 wherein the ratio of the plurality of fly ash aggregates to the carrier fluid introduced into the at least one fracture is in the range of from about 1:5 by volume to about 4:5 by volume.

55. The method of claim 53 further comprising recovering at least a portion of the carrier fluid from the at least one fracture, wherein at least a substantial portion of the plurality of fly ash aggregates is not recovered from the at least one fracture.

56. The method of claim 52 wherein the carrier fluid comprises a component selected from the group consisting of: an aqueous gel, an oil gel, a foamed gel, an emulsion, a viscoelastic surfactant gel, and a combination thereof.

57. The method of claim 52 wherein the carrier fluid comprises a component selected from the group consisting of: a phosphoric acid, a phosphoric acid precursor, and a combination thereof.

58. The method of claim 52 wherein the carrier fluid comprises encapsulated phosphoric acid.

59. The method of claim 52 wherein the carrier fluid comprises a component selected from the group consisting of: a phosphorous pentoxide, a polyphosphoric acid, a salt of polyphosphoric acid, a salt of phosphoric acid, and a combination thereof.

60. The method of claim 52 wherein the carrier fluid comprises an encapsulated phosphoric acid precursor.

61. The method of claim 48 wherein the curing comprises contacting the portion of the fly ash aggregates with a phosphoric acid and/or a polyphosphoric acid.

62. The method of claim 61 further comprising allowing a phosphoric acid precursor to hydrolyze so as to form the phosphoric acid.

63. The method of claim 48 further comprising shutting in the well bore for a period of time after the introducing the plurality of fly ash aggregates into the at least one fracture.

64. A method for the downhole formation of proppant particulates, comprising: forming a plurality of fly ash aggregates, each fly ash aggregate comprising an aqueous component and fly ash;

introducing the plurality of fly ash aggregates into at least one fracture in a subterranean formation;

contacting at least a portion of the fly ash aggregates with a phosphoric acid; and allowing the portion of the fly ash aggregates to cure into a at least one hardened mass within the at least one fracture.

65. A method of propping at least one fracture in a subterranean formation, comprising:

forming a plurality of fly ash aggregates, each fly ash aggregate comprising an aqueous component and fly ash;

suspending the plurality of fly ash aggregates in a carrier fluid;

introducing the carrier fluid into the at least one fracture, the carrier fluid containing the plurality of fly ash aggregates suspended therein;

contacting at least a portion of the fly ash aggregates with a phosphoric acid; allowing the portion of the fly ash aggregates to cure into at least one hardened mass within the at least one fracture; and recovering at least a portion of the carrier fluid from the at least one fracture.

* * * * *